(12) United States Patent
Slusar

(10) Patent No.: US 12,020,519 B2
(45) Date of Patent: *Jun. 25, 2024

(54) TELEMATICS AUTHENTICATION

(71) Applicant: ALLSTATE INSURANCE COMPANY, Northbrook, IL (US)

(72) Inventor: Mark V. Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/749,744

(22) Filed: May 20, 2022

(65) Prior Publication Data

US 2022/0351557 A1 Nov. 3, 2022

Related U.S. Application Data

(60) Continuation of application No. 16/213,588, filed on Dec. 7, 2018, now Pat. No. 11,367,319, which is a
(Continued)

(51) Int. Cl.
*G07C 5/00* (2006.01)
*G06F 21/00* (2013.01)
(Continued)

(52) U.S. Cl.
CPC .......... *G07C 5/0841* (2013.01); *G06F 21/00* (2013.01); *G06F 21/606* (2013.01);
(Continued)

(58) Field of Classification Search
CPC ....... G07C 5/0841; G07C 5/008; G06F 21/00; G06F 21/606; G06F 21/6245;
(Continued)

(56) References Cited

U.S. PATENT DOCUMENTS 6,339,745 B1 1/2002 Novik
6,574,734 B1 6/2003 Colson et al.
(Continued)

FOREIGN PATENT DOCUMENTS

CN 103716160 A 4/2014
JP 2004145920 A 5/2004
(Continued)

OTHER PUBLICATIONS

Jun. 9, 2017—(PCT) International Search Report—PCT/US17/16500.
(Continued)

*Primary Examiner* — Bao Long T Nguyen
(74) *Attorney, Agent, or Firm* — Dinsmore & Shohl LLP

(57) ABSTRACT

Systems and methods for determining the authenticity of vehicle operational data provided by telematics or other devices are provided. Vehicle performance and/or operational data may be collected and the authenticity of the data stream may be determined based on the whether the data stream includes a watermark in a predetermined location of the data stream or whether the data stream includes a data key comprising a predetermined false vehicle performance data reading. A second data recording device may also record vehicle performance and/or operational data. Both the first and second data recording devices may provide the respective vehicle performance data to a computing device. The computing device may compare the vehicle performance data from the first and second data recording devices to determine authenticity of the vehicle measurement data.

20 Claims, 7 Drawing Sheets

Related U.S. Application Data division of application No. 15/018,184, filed on Feb. 8, 2016, now Pat. No. 10,181,228.

(51) Int. Cl.
*G06F 21/60* (2013.01)
*G06F 21/62* (2013.01)
*G07C 5/08* (2006.01)
*G06F 21/10* (2013.01)

(52) U.S. Cl.
CPC ......... *G06F 21/6245* (2013.01); *G07C 5/008* (2013.01); *G06F 21/1063* (2023.08)

(58) Field of Classification Search
CPC ......... G06F 21/1063; G06F 2221/0733; G06F 21/10; G06F 21/16; G06F 21/44; G06F 2221/0737

See application file for complete search history.

(56) References Cited

U.S. PATENT DOCUMENTS

| | | | |
|---|---|---|---|
| 7,389,420 B2 * | 6/2008 | Tian ................ | H04N 21/23892 713/176 |
| RE41,395 E | 6/2010 | Jambhekar et al. | |
| 8,140,358 B1 | 3/2012 | Ling et al. | |
| 8,452,482 B2 | 5/2013 | Cramer et al. | |
| 8,630,768 B2 | 1/2014 | McClellan et al. | |
| 8,791,835 B2 | 7/2014 | Sella | |
| 8,798,852 B1 | 8/2014 | Chen et al. | |
| 9,104,535 B1 | 8/2015 | Brinkmann et al. | |
| 9,197,413 B1 | 11/2015 | Hall, III et al. | |
| 9,623,876 B1 | 4/2017 | Slusar | |
| 11,367,319 B2 * | 6/2022 | Slusar ................ | G06F 21/6245 |
| 2003/0088348 A1 | 5/2003 | Gustavsson et al. | |
| 2004/0225557 A1 | 11/2004 | Phelan et al. | |
| 2007/0082679 A1 | 4/2007 | Kim et al. | |
| 2007/0266250 A1 | 11/2007 | Kampert et al. | |
| 2008/0319665 A1 | 12/2008 | Berkobin et al. | |
| 2009/0033510 A1 | 2/2009 | Izumi et al. | |
| 2009/0118899 A1 | 5/2009 | Carlson | |
| 2010/0228404 A1 | 9/2010 | Link, II et al. | |
| 2011/0058048 A1 | 3/2011 | Elazar et al. | |
| 2011/0125363 A1 | 5/2011 | Blumer et al. | |
| 2011/0160951 A1 | 6/2011 | Ishigooka et al. | |
| 2012/0053759 A1 | 3/2012 | Lowrey et al. | |
| 2012/0302265 A1 | 11/2012 | Lei et al. | |
| 2013/0067253 A1 | 3/2013 | Tsuda | |
| 2013/0073112 A1 | 3/2013 | Phelan et al. | |
| 2013/0179198 A1 | 7/2013 | Bowne et al. | |
| 2013/0227648 A1 | 8/2013 | Ricci | |
| 2014/0040992 A1 | 2/2014 | Koide et al. | |
| 2014/0075198 A1 | 3/2014 | Peirce et al. | |
| 2014/0080100 A1 | 3/2014 | Phelan et al. | |
| 2014/0096217 A1 | 4/2014 | Lehmann | |
| 2014/0114696 A1 | 4/2014 | Amigo et al. | |
| 2014/0148997 A1 | 5/2014 | Aaron et al. | |
| 2014/0172229 A1 | 6/2014 | Rude et al. | |
| 2014/0213238 A1 | 7/2014 | Giraud et al. | |
| 2014/0214261 A1 | 7/2014 | Ramamoorthy et al. | |
| 2015/0046021 A1 | 2/2015 | Kim et al. | |
| 2015/0154818 A1 | 6/2015 | Lee | |
| 2015/0227760 A1 | 8/2015 | Zhang | |
| 2015/0344038 A1 | 12/2015 | Stenneth et al. | |
| 2017/0183015 A1 | 6/2017 | Phelan et al. | |

FOREIGN PATENT DOCUMENTS

| | | |
|---|---|---|
| JP | 2005004359 A | 1/2005 |
| JP | 2011101118 A | 11/2012 |
| WO | 2015075578 A1 | 5/2015 |

OTHER PUBLICATIONS

Jul. 10, 2017—U.S. Non-Final Office Action—U.S. Appl. No. 15/018,184.
Nov. 9, 2017—U.S. Final Office Action—U.S. Appl. No. 15/018,184.
Apr. 13, 2018—U.S. Non-Final Office Action—U.S. Appl. No. 15/018,184.
Jun. 17, 2019—(CA) Office Action—Application No. 3,013,911.
Aug. 30, 2019—(EP) Supplemental Search Report—Application No. 17750598.
Nov. 4, 2020—(JP) Office Action—App. No. 2018541316.
Dec. 30, 2020—(IN) Examination Report—App. No. 201847029799.
May 28, 2021—(CA) Office Action—App. No. 3013911.

* cited by examiner

TELEMATICS AUTHENTICATION

CROSS REFERENCE TO RELATED APPLICATIONS

This application is a continuation of U.S. patent application Ser. No. 16/213,588 filed Dec. 7, 2018, which is a divisional of U.S. patent application Ser. No. 15/018,184 filed Feb. 8, 2016, and entitled "Telematics Authentication," which is incorporated herein by reference in its entirety.

TECHNICAL FIELD

Aspects of the disclosure generally relate to the authentication of telematics data. In particular, various aspects of the disclosure relate to data watermarking and data corroboratory procedures to determine the authenticity of vehicle performance and/or operational data provided to, and/or received from, a telematics device.

BACKGROUND

In the automotive insurance industry, there is a need for systems and methods to protect, authenticate, and verify vehicle measurement data associated with telematics devices. The data provided by such devices has become increasingly utilized in recent years to gain powerful insights into the behavior of insured drivers, and ultimately, to tailor sophisticated insurance plans on a driver-by-driver basis.

Telematics devices may be used to monitor a multitude of vehicle systems and provide end data concerning engine RPM, emissions, vehicle speed, throttle position, acceleration and braking rates, use of onboard driver control systems, interior and exterior temperature, and the like. Insurance providers may be able to use such data to assess the risk associated with any given driver and subsequently calculate an appropriate insurance premium befitting of the driver's behavior. For example, drivers who are shown to accelerate gradually, break gently, and change lanes smoothly might be provided with lower premiums and additional benefits as compared to drivers who accelerate rapidly, brake forcefully, and change lanes abruptly.

Often times, the premium discounts and rewards generated in response to telematics data indicating safe driving behavior are impactful for both the insured driver and insurance provider. From the insured driver's perspective, the financial incentives provide strong motivation to abide by safe driving procedures. From that of the insurance provider, encouraging and rewarding safe driving habits helps reduce the likelihood of accidents and the potential costs of submitted claims.

The integrity of the above mentioned relationship is contingent on the legitimacy of the telematics data provided by the telematics device. If the vehicle data provided by the telematics device is adulterated in any way, shape, or form, the justification behind providing premium discounts and rewards is nullified. However, the use of intermediate "smoothing" devices in conjunction with telematics devices has become increasingly prevalent. Such smoothing devices have been shown to regulate and alter the end data provided by the vehicle to the telematics device in such a manner as to, in at least some examples, misrepresent the driving behavior of drivers. For example, smoothing devices may be placed in an intermediary position between a vehicle data port and the telematics device so as to modify and lessen key vehicle data such as vehicle speed, acceleration, and brake force favorably for the driver.

In light of the above, there is a considerable need for systems and methods to protect, authenticate, and verify vehicle measurement data provided by telematics devices.

SUMMARY

The following presents a simplified summary in order to provide a basic understanding of some aspects of the disclosure. The summary is not an exhaustive overview of the disclosure. It is for illustrative purposes only and is not intended to limit or constrain the detailed description. The following summary merely presents some concepts of the invention in a simplified form as a prelude to the more detailed description provided below.

Aspects of the disclosure address one or more of the issues mentioned above by disclosing methods, computer readable storage media, software, systems and apparatuses for protecting, authenticating, and verifying vehicle measurement and/or operational data provided by telematics devices. In at least some examples described herein, a telematics device may be used to receive a data stream comprising vehicle performance and/or operational data. An additional device such as a mobile device may be used to record an additional set of vehicle performance and/or operational data. The two sets of vehicle performance and/or operational data may be transmitted to a computing device and compared to determine the authenticity of the vehicle performance and/or operational data provided by the telematics device.

In other aspects of the present disclosure, the computing device may determine the authenticity of the data stream, for example, by determining whether the data stream comprises a watermark. The computing device, upon determining that the data stream comprises the watermark, may then authenticate and verify the watermark.

In some aspects of the disclosure, the watermark may be a data code inserted into the data stream in a predetermined location and, the computing device, in response to determining that the data stream comprises the data code in the predetermined location, may further determine whether the data code matches an authenticity code. In other aspects of the disclosure, the watermark may be a data key inserted into the data stream in a predetermined location and, the computing device, in response to determining that the data stream comprises the data key in the predetermined location, may further determine whether the data key is of a predetermined type and magnitude.

The details of these and other aspects of the disclosure are set forth in the accompanying drawings and descriptions below. Other features and advantages of aspects of the disclosure may be apparent from the descriptions and drawings.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In accordance with various aspects of the disclosure, methods, non-transitory computer-readable media, apparatuses, and systems are disclosed for protecting, authenticating, and verifying vehicle measurement data provided by telematics devices.

As stated above, intermediary smoothing devices have arisen that alter vehicle performance and/or operational data provided to, and received from, telematics devices. Such smoothing devices have been shown to regulate and alter the end data provided by the vehicle to the telematics device in such a manner as to, in at least some examples, misrepresent the driving behavior of drivers. The following, in accordance with various aspects of the disclosure, provides methods, non-transitory computer-readable media, apparatuses, and systems for determining the authenticity of vehicle performance and/or operational data provided by telematics devices through the utilization of data watermarking and comparative data analysis procedures.

Figure 1:
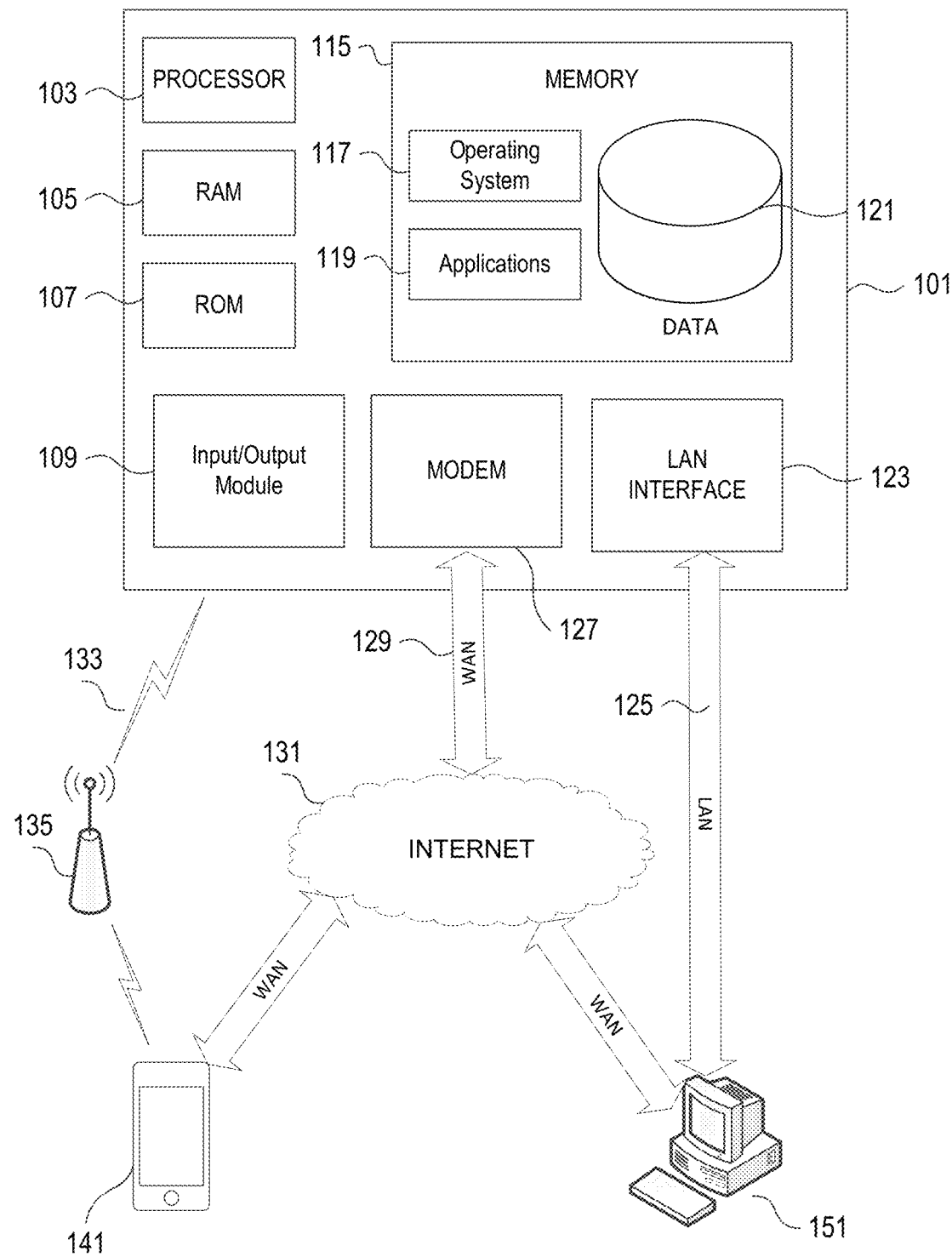
FIG. 1 illustrates an example operating environment in accordance with aspects of the present disclosure.

FIG. 1 illustrates an example of a suitable computing system 100 that may be used according to one or more illustrative embodiments. The computing system 100 is only one example of a suitable computing system and is not intended to suggest any limitation as to the scope of use or functionality contained in the present disclosure. The computing system 100 should not be interpreted as having any dependency or requirement relating to any one or combination of components shown in the illustrative computing system.

The present disclosure is operational with numerous other computing systems or configurations. Examples of computing systems, environments, and/or configurations that may be suitable for use with the disclosed embodiments include, but are not limited to, personal computers (PCs), server computers, mobile or laptop devices, mobile devices, tablets, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system 100 may include a telematics data authentication computing device 101 wherein the processes discussed herein may be implemented. The telematics data authentication computing device 101 may have a processor 103 for controlling the overall operation of the random access memory (RAM) 105, read-only memory (ROM) 107, input/output module 109, memory 115, modem 127, and local area network (LAN) interface 123. Processor 103 and its associated components may allow the telematics data authentication computing device 101 to run a series of computer readable instructions related to receiving, storing, generating, calculating, identifying, and analyzing data to protect, authenticate, and verify vehicle measurement data provided by a telematics device. Computing system 100 may also include optical scanners (not shown). Exemplary usages include scanning and converting paper documents, such as correspondence, data, and the like to digital files.

Telematics data authentication computing device 101 may include a variety of computer-readable media. Computer-readable media may be any available media that may be accessed by telematics data authentication computing device 101 and include both volatile and non-volatile media as well as removable and non-removable media. Computer-readable media may be implemented in any method or technology for storage of information such as computer-readable instructions, data structures, program modules, or other data. Computer-readable media include, but are not limited to, random access memory (RAM), read only memory (ROM), electronically erasable programmable read only memory (EEPROM), flash memory or other memory technology, or any other medium that can be used to store desired information that can be accessed by telematics data authentication computing device 101. For example, computer-readable media may comprise a combination of computer storage media (including non-transitory computer-readable media) and communication media.

RAM 105 may include one or more applications representing the application data stored in RAM 105 while the telematics data authentication computing device 101 is on and corresponding software applications (e.g., software tasks) are running on the telematics data authentication computing device 101.

Input/output module 109 may include a sensor(s), a keypad, a touch screen, a microphone, and/or a stylus through which a user of telematics data authentication computing device 101 may provide input, and may also include a speaker(s) for providing audio output and a video display device for providing textual, audiovisual, and/or graphical output.

Software may be stored within memory 115 and/or storage to provide instructions to processor 103 for enabling telematics data authentication computing device 101 to perform various functions. For example, memory 115 may store software used by the telematics data authentication computing device 101, such as an operation system 117, application program(s) 119, and an associated database 121. Also, some or all of the computer-executable instructions for telematics data authentication computing device 101 may be embodied in hardware or firmware.

Telematics data authentication computing device 101 may operate in a networked environment supporting connections to one or more remote computing devices, such as computing devices 135, 141, and 151. The computing devices 141 and 151 may be personal computing devices, mobile computing devices, or servers that include many or all of the elements described above about the telematics data authentication computing device 101. The computing device 135 may be a transceiver or sensor that includes many or all of the elements described above about telematics data authentication computing device 101.

The network connections depicted in FIG. 1 include a local area network (LAN) 125 and a wide area network (WAN) 129, but may also include another type of network. When used in a LAN networking environment, telematics data authentication computing device (e.g. in some instances a server) 101 may be connected to the LAN 125 through a network interface (e.g. LAN interface 123) or adapter in the communications module 109. When used in a WAN networking environment, the telematics data authentication computing device 101 may include a modem 127 or other means for establishing communications over the WAN 129, such as the Internet 131 or another type of computer network. It will be appreciated that the network connections shown are illustrative, and other means of establishing a communications link between the computing devices may be used. Various protocols such as TCP/IP, Ethernet, FTP, HTTP and the like may be used, and the system may be operated in a client-server configuration to permit a user to retrieve a web page from a web-based server. Further, various conventional web browsers may be used to display and manipulate web pages.

Various aspects described herein may be embodied as a method, a data processing system, or as a computer-readable medium storing computer-executable instructions. For example, a computer-readable medium may store instructions to cause a processor 103 to perform steps of methods described herein. Such a processor 103 may execute computer-executable instructions stored on a computer-readable medium.

Figure 2:
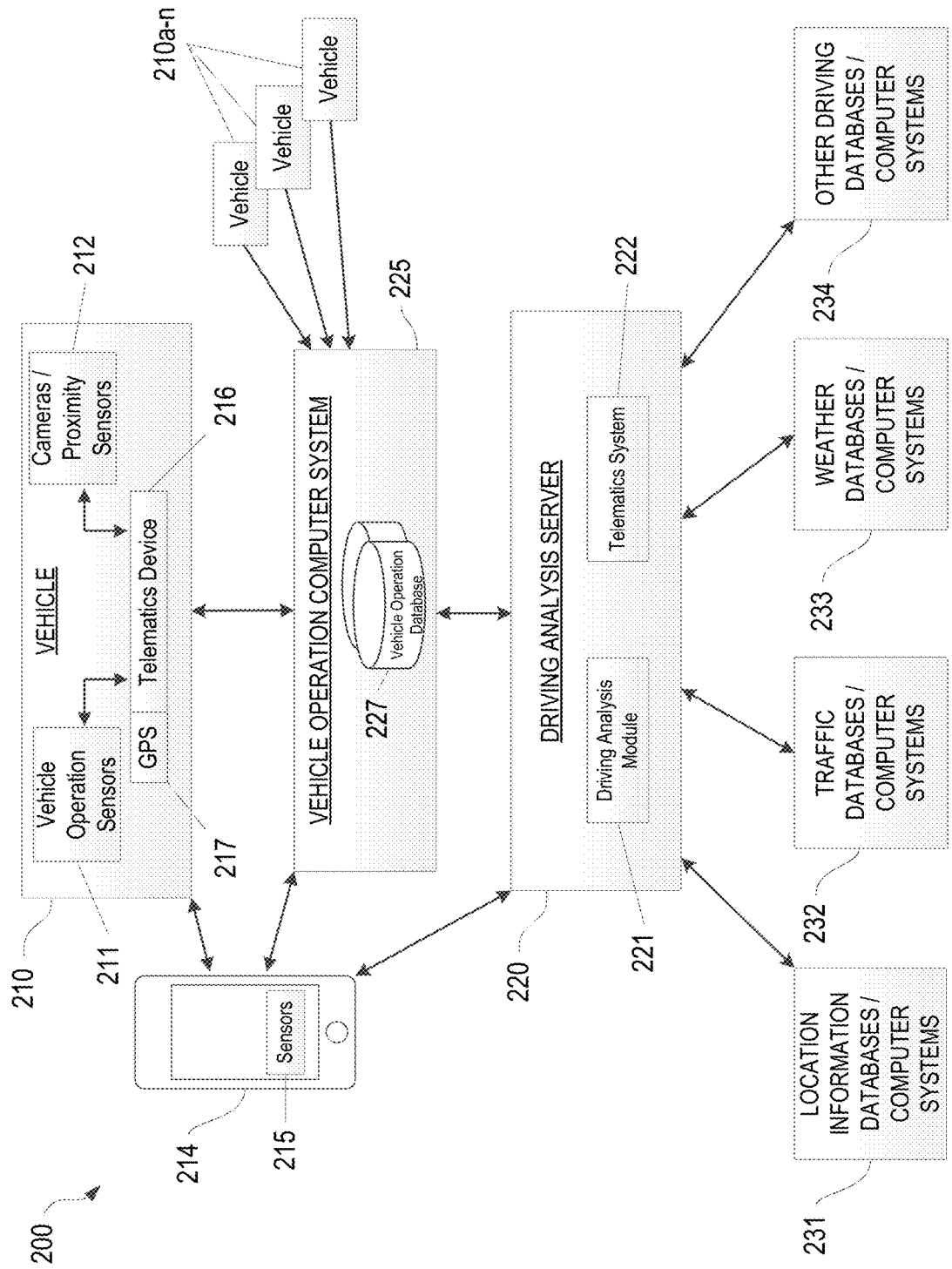
FIG. 2 depicts a vehicle performance and/or operational data management system in accordance with aspects of the present disclosure.

FIG. 2 is a diagram of an illustrative vehicle performance and/or operational data management system 200. Each component shown in FIG. 2 may be implemented in hardware, software, or a combination of the two. Additionally, each component of the vehicle performance and/or operational data management system 200 may include a computing device (or system) having some or all of the structural components described above for telematics data authentication computing device 101.

The vehicle performance and/or operational data management system 200 shown in FIG. 2 includes a vehicle 210, such as an automobile, motorcycle, or other vehicle from which vehicle performance and/or operational data may be generated and, ultimately, protected, authenticated, and/or verified. The vehicle 210 may include vehicle operation sensors 211 capable of detecting, recording, and transmitting various vehicle performance and/or operational data. For example, sensors 211 may detect, store, and transmit data corresponding to the vehicle's speed, distances driven, rates of acceleration or braking, and specific instances of sudden acceleration, braking, swerving, and the like. Sensors 211 also may detect, store and transmit data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, internal decibel levels, maintenance performed on the vehicle, and other data collected by the vehicle's computer systems.

Additional sensors 211 may detect, store, and transmit the external driving conditions, for example, external temperature, rain, snow, light levels, and sun position for driver visibility. Sensors 211 also may detect, store, and transmit data relating to moving violations and the observance of traffic signals and signs by the vehicle 210. Additional sensors 211 may detect and store data relating to the maintenance of the vehicle 210, such as the engine status, oil level, engine coolant temperature, odometer reading, the level of fuel in the fuel tank, engine revolutions per minute (RPMs), and/or tire pressure.

The vehicle 210 also may include one or more cameras and proximity sensors 212 capable of recording additional conditions inside or outside of the vehicle 210. Internal cameras 212 may detect conditions such as the number of the passengers in the vehicle 210, and potential sources of driver distraction within the vehicle (e.g., pets, phone usage, and unsecured objects in the vehicle). External cameras and proximity sensors 212 may detect other nearby vehicles, traffic levels, road conditions, traffic obstructions, animals, cyclists, pedestrians, and other conditions that may factor into driving trip and/or driving data analyses.

The operational sensors 211 and the cameras and proximity sensors 212 may store data within the vehicle 210, and/or may transmit the data to one or more external computer systems (e.g., a vehicle operation computer system 225 and/or a driving analysis server 220). As shown in FIG. 2, the operation sensors 211, and the cameras and proximity sensors 212, may be configured to transmit vehicle performance and/or operational data to a vehicle operation computer system 225 via a telematics device 216. In other examples, one or more of the operation sensors 211 and/or the cameras and proximity sensors 212 may be configured to transmit vehicle performance and/or operational data directly without using a telematics device 216. In certain embodiments, the transmission of data by operation sensors 211 and/or cameras and proximity sensors 212 may be done in real-time and the vehicle performance and/or operational data may be accompanied with the time at which the data was recorded. The operational sensors 211 and the cameras and proximity sensors 212 may be configured to encrypt the data before transmission. In such instances, data encryption techniques used by operational sensors 211 and the cameras and proximity sensors 212 to encrypt the data may include SSL, Triple DES, RSA, Blowfish, Twofish, AES, or other symmetric encryption methods, asymmetric encryption methods, and hashing encryption methods. Additional encryption methods may be used.

Telematics device 216 may be a computing device containing many or all of the hardware/software components as the telematics data authentication computing device 101 depicted in FIG. 1. As discussed above, the telematics device 216 may receive vehicle performance and/or operational data from vehicle sensors 211, and proximity sensors and cameras 212, and may transmit the data to one or more external computer systems (e.g., a vehicle operation computer system 225 and/or a driving analysis server 220) over a wireless transmission network. The transmission of data by telematics device 216 to the one or more external computer systems may be done in real-time, or in response to a request event (e.g., user request, vehicle request, server request, etc.). Telematics device 216 may be configured to encrypt the data received from vehicle sensors 211 and proximity sensors and cameras 212 before transmitting the data to the one or more external computer systems. The encryption methods used by telematics device 216 may be similar to those described above. Additionally or alternatively, telematics device 216 may be further configured to establish a secure communication channel and/or link with one or more external computer systems before transmitting data.

Telematics device 216 also may be configured to independently detect or determine additional types of data relating to real-time driving and the condition of the vehicle 210. Telematics device 216 may be configured to encrypt such data before transmission to the one or more external computer systems. In certain embodiments, the telematics device 216 may contain sensors including accelerometers, gyroscope, compass, and the like in addition to being integral with one or more of the vehicle sensors 211 and proximity sensors and cameras 212 discussed above. Accordingly, telematics device 216, using sensors and cameras included therein, may be able to independently record vehicle performance and/or operational data in real-time and further associate the data with the time at which the data was recorded. For example, telematics device 216 may be able to record, via the accelerometer, interior vehicle decibel levels produced by a sound system in vehicle 210. Such interior vehicle decibel data may be associated with the time at which the data was recorded. If, for instance, the driver of the vehicle were to get into an accident at a specific time, an accelerometer reading indicating excessive interior vehicle decibel levels at the time of the accident could serve as an indication of unsafe driving conditions at the time of the incident.

In other examples, the interior noise level may affect readings of an accelerometer. Accordingly, one or more components of the system may be configured to identify interior noise (e.g., bass from music being played) and filter out the noise in order to obtain an accurate reading.

Additionally, the telematics device 216 may be configured to collect data regarding the number of passengers and the types of passengers (e.g. adults, children, teenagers, pets, etc.) in the vehicle 210. The telematics device 216 also may be configured to collect data regarding a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The telematics device 216 also may collect information regarding the vehicle's location at different times, the driver's route choice, whether the driver follows a given route, and may classify the type of trip (e.g., work or school commute, shopping, church, park, errands, house of friend or relation, etc.). To determine the vehicle's location, route, and other data, the telematics device 216 may include or may receive data from a Global Positioning System (GPS) 217, or other locational device. The GPS system 217 may be integrated into the telematics device 216, or one or more other devices within the vehicle 210 (e.g., a GPS navigation device, mobile telephone, or other mobile GPS-enabled device, etc.). Vehicle location data may be received by the telematics device 216 from the GPS system 217, and then transmitted to one or more additional systems, such as the vehicle operation computer system 225 or driving analysis server 220. The vehicle location data may be encrypted by telematics device 216 before transmission. In other examples, one or more GPS systems 217 within the vehicle 210 may transmit vehicle location data directly to the vehicle operation computer system 225, driving analysis server 220, or other additional system.

The telematics device 216 also may store the type of the vehicle 210, for example, the make, model, trim (or sub-model), year, and/or manufacturer engine specifications. The vehicle type may be programmed into the telematics device 216 by a user or customer, determined by accessing a remote computer system, such as an insurance company or financial institution server, or may be determined from the vehicle itself (e.g., by accessing the vehicle's 210 on-board computer systems).

In some embodiments, telematics device 216 may be able to process the above mentioned data and perform the data decryption, authentication, and corroboratory methods described herein. Accordingly, telematics device may able to independently authenticate the received data without sending the data to the external computing systems.

The system 200 may, in some examples, include a mobile device 214. The mobile device may include hardware and/or software configured to perform functions similar to the telematics device 216. Accordingly, although the application generally refers to telematics data provided to, and from, a telematics device, the system described in detail below may also be operable with various other types of data collected and/or received from various sources (e.g., mobile device 214). In such an instance, mobile device 214 may suffice for telematics device 216. For example, mobile device 214 may be configured to receive data from vehicle operation sensors 211 and/or cameras and proximity sensors 212. Mobile device 214 may also include one or more sensors 215 configured to collect and/or record vehicle performance data. Sensors 215 may be a variety of sensors including accelerometers, gyroscope, compass, and global positioning system sensors, and the like. In certain embodiments, the mobile device 214 may be configured to analyze the collected data for authenticity (either from sensors 215 or sensors such as vehicle operation sensors 211 and cameras/proximity sensors 212) or may be configured to transmit the data to an external computing device for analysis, similar to the arrangement described herein with respect to telematics device 216.

Vehicle operation computer system 225 may be a computing device separate from the vehicle 210, containing some or all of the hardware/software components as the telematics data authentication computing device 101 depicted in FIG. 1. The vehicle operation computer system 225 may be configured to receive, store, and transmit vehicle performance and/or operational data discussed above from vehicle 210, and similar vehicle performance and/or operational data from one or more other vehicles 210a-n. In the example shown in FIG. 2, the vehicle operation computer system 225 includes a vehicle operation database 227 that may be configured to store vehicle performance and/or operational data collected from the vehicle operation sensors 211, proximity sensors and cameras 212, mobile device 214 and sensors 215 comprised therein, telematics devices 216, and GPS devices 217 of a plurality of vehicles.

Furthermore, vehicle operation computer system 225 may include expected data thresholds or expected data curves concerning vehicle 210 or vehicles 210a-n. Such expected data thresholds or expected data curves may include vehicle information provided by the manufacturer of the vehicle. Such vehicle information may include expected values of engine temperature, turbocharger RPM, or the like of stock engine vehicle parts (e.g., engine, exhaust, brakes, etc.) installed by the manufacturer during vehicle production under certain vehicle usage conditions. The data thresholds or expected data curves may also be included in the driving analysis server 220, driving analysis module 221, telematics system 222, record database 324, and/or data authenticity server 328 all of which are discussed in further detail below.

Data stored in the vehicle operation database 227 may be organized in any of several different manners. For example, a table in the vehicle operation database 227 may contain all of the vehicle performance and/or operational data for a specific vehicle 210, similar to a vehicle event log or vehicle driving trip log. Other tables in the vehicle operation database 227 may store certain types of data for multiple vehicles. For instance, tables may store specific driving behaviors (e.g., driving speed, acceleration and braking rates, swerving, tailgating, use of seat belts, turn signals or other vehicle controls, etc.) for multiples vehicles 210 at specific locations, such as specific neighborhoods, roads, or intersections. Vehicle performance and/or operational data may also be organized by location and/or time, so that events or behaviors of multiples vehicles 210 may be stored or grouped by time (e.g., morning, afternoon, late night, rush hour, weekends, etc.) as well as location.

The system 200 also may include a driving analysis server 220, containing some or all of the hardware/software components as the telematics data authentication computing device 101 depicted in FIG. 1. The driving analysis server 220 may include hardware, software, and network components to receive vehicle performance and/or operational data from mobile device 214, telematics device 216, from the plurality of vehicles 210a-n, and/or vehicle operation computer system 225. The driving analysis server 220 and the vehicle operation computer system 225 may be implemented as a single server/system, or may be separate servers/systems. In some examples, the driving analysis server 220 may be a central server configured to receive vehicle operation data from a plurality of remotely located vehicle operation computer systems 225.

As shown in FIG. 2, driving analysis server 220 may include a driving analysis module 221 and a telematics system 222. Module 221 and system 222 may be implemented in hardware and/or software configured to perform a set of specific functions within the driving analysis server 220. For example, the driving analysis module 221 may include one or more driving analysis algorithms, which may be executed by one or more software applications running on generic or specialized hardware within the driving analysis server 220. The driving analysis module 221 may use vehicle performance and/or operational data received from the vehicle 210 or the vehicle operation computer system 225 (e.g., vehicle location and time data) to perform driving analyses for vehicles 210. The driving analysis performed may be used in various ways, including evaluation of insurance premiums, determining insurance discounts or incentives, determine safe driver status, and the like. Telematics system 222 and the hardware/software components comprised therein are described in further detail below in reference to FIGS. 4-7.

To perform driving analyses, the driving analysis server 220 may initiate communication with and/or retrieve data from one or more vehicles 210, mobile device 214, telematics device 216, vehicle operation computer systems 225, and additional computer systems 231-234 storing data that may be relevant to the analyses. For example, the driving analysis server 220 may receive data to perform data authentication, risk factor and risk assessment value determinations, and the like, from one or more location information databases or computer systems 231, one or more traffic data storage systems 232, one or more weather data storage systems 233, and one or more additional driving databases or computer systems 234.

Location information databases 231 may store information regarding a plurality of locations associated with vehicles 210. For example, a location information database 231 may store tables of GPS coordinates (or other location data) for a plurality of locations, along with various properties or characteristics for each location. Sets of GPS coordinates may be associated with different types of locations (e.g., schools, parks, restaurants, airports, gas stations, stores, golf courses, residential addresses, parking lots, etc.) and/or may be associated with specific locations (e.g., ABC Elementary School, XYZ Office Building, JKL Restaurant, etc.). Additional data may be stored regarding each specific location or set of GPS coordinates, such as various risk factors and risk assessment values associated with the location. For instance, for a first location identified by GPS coordinates, or identified by name for a specific business, activity, or property usage, risk data may be stored corresponding to the vehicle damage risk at the first location (e.g., accident statistics, theft and vandalism statistics, or other vehicle damage risks), vehicle parking availability at the first location (e.g., garage, outdoor lot, street parking, valet, etc.), and/or data regarding previous vehicle-related incidents occurring at the location (e.g., insurance claims, vehicles towing records, police reports, etc.)

Traffic databases and other traffic storage systems 232 may store data corresponding to the amount of traffic and certain traffic characteristics (e.g., amount of traffic, average driving speed, traffic speed distribution, and numbers and types of accidents, etc.) at various specific locations and times. Traffic databases 232 also may store image and video data recorded by traffic cameras various specific locations and times. Weather data storage systems 233, such as weather databases, may store weather data (e.g., rain, snow, sleet, hail, temperature, wind, road conditions, visibility, etc.) at different locations and different times. One or more additional driving databases/systems 234 may store additional driving data from one or more different data sources or providers which may be relevant to the data authentication analyses and/or driver score calculations performed by the driving analysis server 220. Additional driving databases/systems 234 may store data regarding events such as road hazards and traffic accidents, downed trees, power outages, road construction zones, school zones, and natural disasters that may affect the data authentication analyses and/or driver score calculations performed by the driving analysis server 220.

Information received from location information databases 231, traffic databases 232, weather databases 233, and driving databases 234 may also be used in various other calculations and determinations without departing from the invention.

Figure 3:
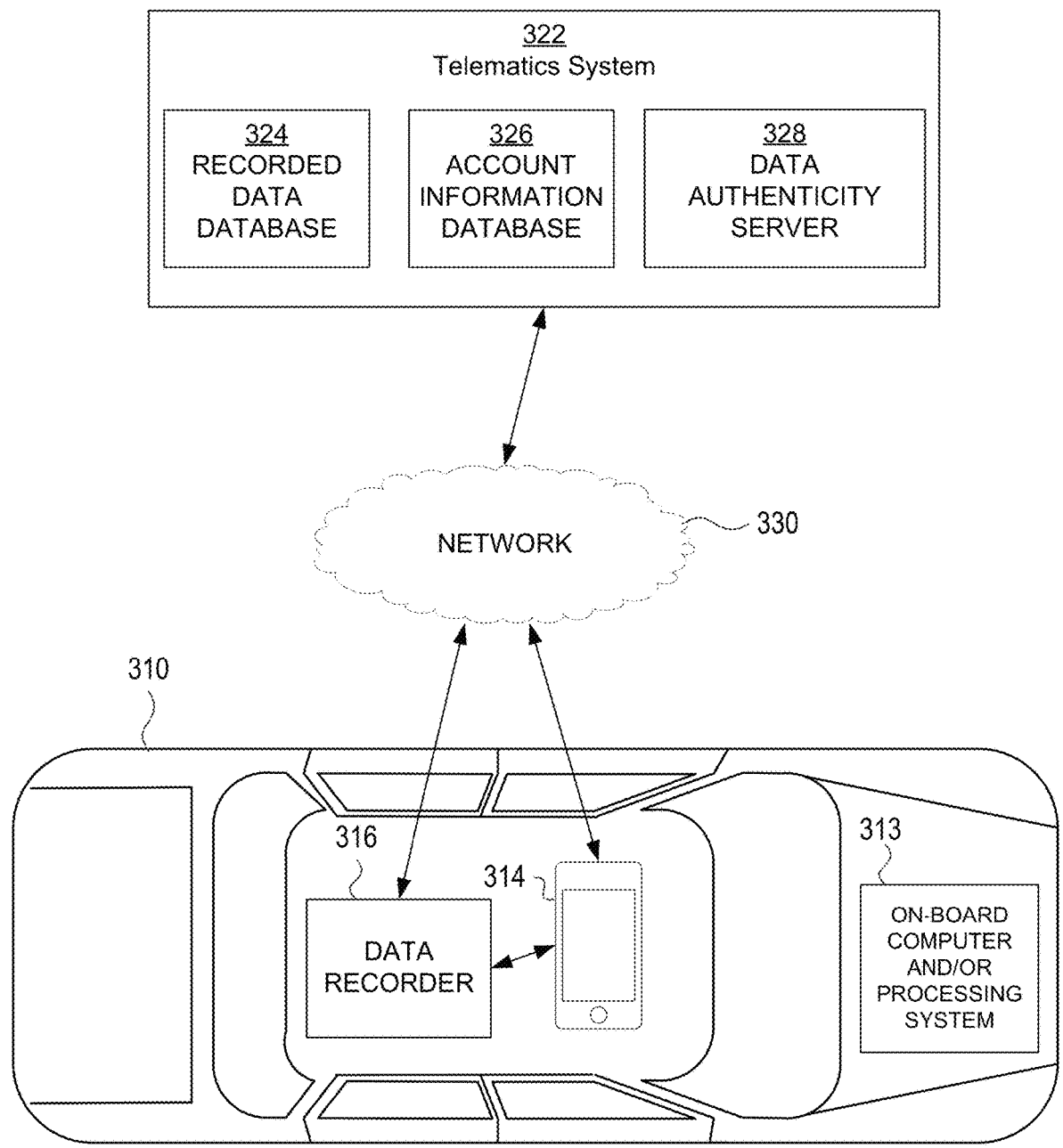
FIG. 3 depicts a telematics data authentication system in accordance with aspects of the present disclosure.

FIG. 3 illustrates an example system that may be used to authenticate telematics data. Although the term "telematics data" is used herein, one or more aspects described herein may be used with data received from or collected by various sources (e.g., sensors, computing devices, mobile devices, etc.). Nothing in the specification should be viewed as limiting the arrangements described herein to use with only a telematics device. Each component shown in FIG. 3 may be implemented in hardware, software, or a combination of the two. Additionally, each component of the telematics data authentication system 300 may include a computing device (or system) having some or all of the structural components described above for telematics data authentication computing device 101.

The telematics data authentication system 300 may include a vehicle 310 that may be similar to and/or include one or more components described with respect to vehicle 210 of FIG. 2. For example, vehicle 310 may include vehicle operation sensors 211 and cameras/proximity sensors 212. Vehicle 310 may be any type of vehicle whether operated by a human or a computer such as a car, a van, a truck, a motorcycle, bus, recreational vehicle, or the like. Vehicle 310 may further include a data recorder 316 that may include one or more components of a computing device and may include one or more components described herein with respect to telematics device 216. A mobile computing device 314 may also be located within the vehicle 310. Mobile computing device 314 may function similarly to mobile device 214. Data recorder 316 and/or mobile computing device 314 may communicate with a telematics system 322 over a network 330. Telematics system 322 may include a recorded data database 324, an account information database 326, and a data authenticity server 328.

Vehicle 310 may include an on-board computer and/or processing system 313 which monitors and controls aspects of vehicle 310. The on-board computer and/or processing system 313 may receive, monitor, and transmit the vehicle performance and/or operational data received from vehicle operation sensors 211 and cameras/proximity sensors 212 as discussed above. On-board computer and/processing system 313 may be able to format the vehicle performance and/or operational data into a data stream and output the data stream to data recorder 316 via the data port, Bluetooth connection, or the like. In certain embodiments, on-board computer and/or processing system 313 may also be configured to transmit formatted data to mobile computing device 314 and/or telematics system 322 in a manner similar to that of data recorder 316. The on-board computer and/or processing system 313 may format the vehicle performance and/or operational data according to aspects described herein to protect the vehicle performance and/or operational data from modification and/or corruption. For example, the on-board computer and/or processing system 313 may encrypt and/or watermark the vehicle performance and/or operational data before outputting the data to data recorder 312.

In instances in which data encryption techniques are implemented, the on-board computer and/or processing system 313 may be configured to encrypt the data stream before outputting the data stream to data recorder 316. In such instances, various data encryption techniques may be used by the on-board computer and/or processing system 313 to encrypt the data stream including SSL, Triple DES, RSA, Blowfish, Twofish, and AES, along with other symmetric encryption methods, asymmetric encryption methods, and hashing encryption methods. Additional encryption methods may be used. The information corresponding to the data encryption techniques may be stored in memory of on-board computer and/or processing system 313. The data encryption methods may allow for the open transmission of the data stream from the on-board computer and/or processing system regardless of whether or not an intermediary smoothing device is present. Alternatively, on-board computer and/or processing system 313 may be configured to establish a secure communication channel and/or link before transmitting the data stream.

As stated above, vehicle operation sensors 211 and cameras/proximity sensors 212 may also be configured to encrypt data before transmitting to the on-board computer and/or processing system 313. In such instances, on-board computer and/or processing system 313 may further encrypt the data before transmission to data recorder 316. Alternatively, on-board computer and/or processing system 313 may transmit encrypted data received from vehicle operation sensors 211 and cameras/proximity sensors 212 to data recorder 316 without further encrypting the data stream.

In instances in which watermarking is used to determine or aid in determining authenticity of telematics or other data, the on-board computer and/or processing system 313 may insert a watermark (e.g., data code, data key, or the like) in a predetermined location in a data stream sent to the data recorder 316. For example, the data code may be a character, integer, sequence of characters and/or integers, Fibonacci sequence, or the like appended to the beginning, middle, or terminating decimal places of data. The data key may be a data type (e.g., engine temperature, engine RPM, vehicle velocity, vehicle acceleration, applied brake force, and the like) and corresponding data magnitude associated with the data type. For example, the data key may be data indicating rapid vehicle acceleration to 100 mph and then rapid deceleration to actual vehicle speed. Vehicle acceleration is understood to serve as an example, but any item of vehicle performance data, alone or in combination with other types of data, recited herein can be used as well without departing from the invention. The information for such watermarks may be stored in memory of on-board computer and/or processing system 316. The predetermined location may also be stored in memory of on-board computer and/or processing system 316 and may further guide periodic, aperiodic, or random insertion of the watermark within the data stream. The location, contents, and/or form of the watermark may be used in determining whether the outputted vehicle performance and/or operational data is authentic. For example, an absence of the mark in the predetermined location and/or presence of an incorrect watermark may indicate that the data has been modified and/or corrupted rendering the data inauthentic.

While not explicitly shown in FIG. 3, vehicle 310 may also include a dongle having one or more sensors to collect vehicle performance and/or operational data recording. Such a dongle may include some or all of the hardware/software components described herein with respect to data recorder 316 and/or mobile device 314 and, accordingly, may function similarly as compared to data recorder 316 and mobile device 314 (i.e., able to record, store, and transmit vehicle performance and/or operational). The dongle may also include plurality of sensors such as, but not limited to, an accelerometer, compass, gyroscope, and GPS system. The sensors included in the dongle may be used to independently record vehicle performance and/or operational data such as acceleration, speed, location, braking events, turning, and interior decibel levels. The dongle may be configured to encrypt and transmit the independently recorded vehicle performance and/or operational data to one or more external computer systems. Such vehicle performance and/or operational data recorded by the sensors in the dongle may be used to corroborate vehicle performance and/or operational data provided to data recorder 316, mobile device 314, and data authentication server 318 by on-board computer and/or processing system 313. For example, through utilization of the accelerometer, the dongle may be able to record data concerning vehicle acceleration. Such data may be compared to the acceleration data provided by on-board computer and/or processing system 313. If there are discrepancies between the data provided by the dongle and on-board computer and/or processing system 313, there may be an indication of inauthentic vehicle data (e.g., modified data) being provided by on-board computer and/or processing system 313.

Data recorder 316 may receive vehicle performance and/or operational data in the form of a data stream from on-board computer and/or processing system 313 via a data port, Bluetooth interface, or any comparable communication interface of the vehicle 310. For example, data recorder 316 may be connected to the port of the vehicle 310. The port may be an on-board diagnostic (OBD) device connector. Data recorder 316 may include an OBD device adapter and a memory to store data outputted by the on-board computer and/or processing system 313 via the data port, Bluetooth, or any comparable communication interface of vehicle 310. In certain embodiments, mobile computing device 314 may perform as data recorder 316.

Data recorder 316 may also include sensors such as, but not limited, an accelerometer, compass, gyroscope, and GPS system. Data recorder 316 may be configured to encrypt the data received from such devices according to the encryption methods described herein. Data recorder 316 may include antennas to communicate with other devices wirelessly. For example, data recorder 316 may communicate with telematics system 322 over a wide area network (WAN), cellular network, Wi-Fi network, etc. Data recorder 316 may also communicate with mobile computing device 314 via a wireless connection such as a Wi-Fi connection or Bluetooth connection. In certain embodiments, data recorder 316 may be configured to establish a secure communication link and/or channel with mobile computing device 314 and/or telematics system 322.

In some arrangements described in further detail below, data recorder 316 may be a telematics application operating on mobile computing device 314 and may utilize hardware components comprised therein (e.g., memory, processors, communication hardware, etc.) to receive, store, and transmit vehicle performance and/or operational data outputted by the on-board computer and/or processing system 313. In such an arrangement, data recorder 316 may also utilize sensors included within mobile computing device 314.

In some embodiments, data recorder 316 may store in memory a vehicle identification number (VIN) of a vehicle 310 associated with an insurance policy of an insured driver to corroborate vehicle performance and/or operational data. The VIN associated with vehicle 310 may also be stored in memory comprised on-board computer and/or processing system 313. Upon registration and commencement of an insurance policy, a VIN associated with vehicle 310 may be entered and stored in memory of data recorder 316. During operation of vehicle 310, the on-board computer and/or processing system 313 may attach the VIN of vehicle 310 to the data stream comprising the vehicle performance and/or operational data. On-board computer and/or processing system 313 may output the data stream comprising the VIN and vehicle performance and/or operational data to data recorder 316. Data recorder 316 may corroborate the VIN received in the data stream from on-board computer and/or processing system 316 to the VIN stored in memory. In doing so, data recorder 316 may determine whether or not it is operating in the vehicle associated with the insurance policy of the insured driver.

The vehicle performance and/or operational data may be collected with appropriate permissions (e.g., from the driver, vehicle owner, etc.) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with manufacturer permission such as odometer reading, seat belt status, activation of brakes, degree and duration of steering direction, etc., and implementation of accident avoidance devices such as turning signals, headlights, seatbelts, activation of automated braking systems (ABS), etc. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, etc. The system may recognize or be configured to recognize a particular language emitted by the vehicle system and may configure the recording component to receive or convert data in SAE J1850, ISO ISO9141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Mobile computing device 314 may be, for example, a personal computer (PC), hand-held or laptop device, mobile device, tablet, multiprocessor system, microprocessor-based system, on-board vehicle computing device, telematics device, or the like. Mobile computing device 314 may include various sensors including an accelerometer, compass, gyroscope, and/or GPS system, and the like. The sensors may be used to record data including, but not limited to, vehicle acceleration, speed, location, braking events, interior vehicle decibel levels, turning, and the like. Mobile computing device 314 may be configured to encrypt the data recorded by such sensors according to the data encryption techniques described herein.

Mobile computing device 314 may include a memory storing a telematics application and a processor to execute applications. The telematics application may be downloaded or otherwise provided to the mobile computing device 314 and may be used to collect data from on-board computer and/or processing system 313 of vehicle 310. The telematics application may also use the sensors of mobile computing device 314 to collect data on acceleration, speed, location, braking events, interior vehicle decibel levels, turning, and/or route of vehicle 310 independent from vehicle performance and/or operational data provided by on-board computer and/or processing system 313.

Telematics system 322 may include one or more computing devices such as databases and servers. The databases and servers may be, for example, a recorded data database 324, an account information database 326, and a data authenticity server 328. Data recorder 316, mobile computing device 314, and/or on-board computer and/or processing system 313 can communicate with telematics system 322 over a network 330 such as internet 131, cellular network, wireless network, or Wi-Fi network, or other network. Recorded data database 324 may store recorded data received from data recorder 316, mobile computing device 314, and/or on-board computer and/or processing system 313. The recorded data stored in recorded database 324 may include some or all of vehicle performance and/or operational data collected by, and received from, on-board computer and/or processing system 313, mobile computing device 314, data recorder 316, and the like. Account information database 326 may include information related to an account of a user associated with data recorder 316 and/or vehicle 310. For example, account information of the user may include name, address, serial number or other identifier of data recorder 316, and the like.

Data authenticity server 328 may be a computing device that processes or is configured to process data gathered by data recorder 316, mobile computing device 314, and/or on-board computer and/or processing system 313 to determine authenticity of the gathered data, for example, according to aspects described with respect to FIGS. 4-7. In one embodiment, data authenticity server 328 may be configured to compare vehicle performance and/or operational data received from data recorder 316 and mobile computing device 314 over time periods in which the data was recorded. Through the data comparison, data authenticity server 328 may be able to verify or authenticate the vehicle performance and/or operational data provided by data recorder 316 and mobile computing device 314.

In other embodiments, data authenticity server 328 may also comprise memory in which authenticity codes used in determining the authenticity of the gathered data are stored. The authenticity code may be a code similar to (e.g., having a same or similar format, or the like) the data code used by on-board computer and/or processing system 313 to watermark the data stream. Data authenticity server 328 may pre-store the authenticity code in advance of collection of the vehicle operational and/or performance data. Further, the data authenticity server 328 may also store information associated with the predetermined location used by on-board computer and/or processing system 313 to insert the data code into the known location. Through observing the presence of the data code in the predetermined location, as well as determining the correlation between the data and the authenticity code, data authenticity server 328 may be able to verify or authenticate the vehicle performance and/or operational data provided by data recorder 316 and mobile computing device 314.

In some instances, data authenticity server may store information associated with the data key inserted into the data stream by on-board computer and/or processing system 313. For example, data authenticity server may store a plurality of data types (e.g., engine temperature, engine RPM, vehicle velocity, vehicle acceleration, applied brake force, and the like) and corresponding data magnitudes associated with the data types. Data authenticity server 328 may also store information associated with the predetermined location used by on-board computer and/or processing system 313 to insert the data key into the known location. The data authenticity server 328 may be able to determine the authenticity of vehicle performance and/or operational data provided by data recorder 316 and mobile computing device 314 by determining the presence of the data key in the predetermined location and matching the accompanying data magnitude and type with the stored data magnitude and type.

In other examples mentioned above, data authenticity server 328 may also store information related to expected data thresholds and expected data curves. Such vehicle information may include expected values of engine temperature, turbocharger RPM, or the like of stock engine vehicle parts (e.g., engine, exhaust, brakes, etc.) installed by the manufacturer during vehicle production under certain vehicle usage conditions and may be used to corroborate vehicle performance and/or operational data received from data recorder 316, mobile device 314 or on-board computer and/or processing system 313.

In certain embodiments, the data authenticity server 328 may corroborate data provided by data recorder 316, mobile device 314, and on-board computer and/or processing system 313 through the utilization and extrapolation of complementary data readings provided by the respective devices. For example, data authenticity server may utilize and extrapolate the exhaust pressure and engine temperature to corroborate data corresponding to engine RPM and vehicle acceleration. For instance, if the exhaust pressure and engine temperature are known through the expected data thresholds and expected data curves to correlate with a certain engine RPM and vehicle acceleration and the actual engine RPM and acceleration deviate substantially from the expected values, there could be an indication of inauthentic data and/or high-end aftermarket performance part modifications.

In other embodiments, data authenticity server 328 may store in memory encryption/decryption keys necessary to decrypt encrypted data streams. For example, data authenticity server 328 may store the appropriate key associated with the encryption method used by the dongle, data recorder 316, mobile computer device 314, on-board computer and/or processing system 313 and/or vehicle operation sensors 211 and cameras/proximity sensors 212. As stated above, encryption methods may include SSL, Triple DES, RSA, Blowfish, Twofish, and AES, along with other symmetric encryption methods, asymmetric encryption methods, and hashing encryption methods. Alternatively, other encryption methods may be used and accompanying encryption/decryption keys may be used.

Figure 4:
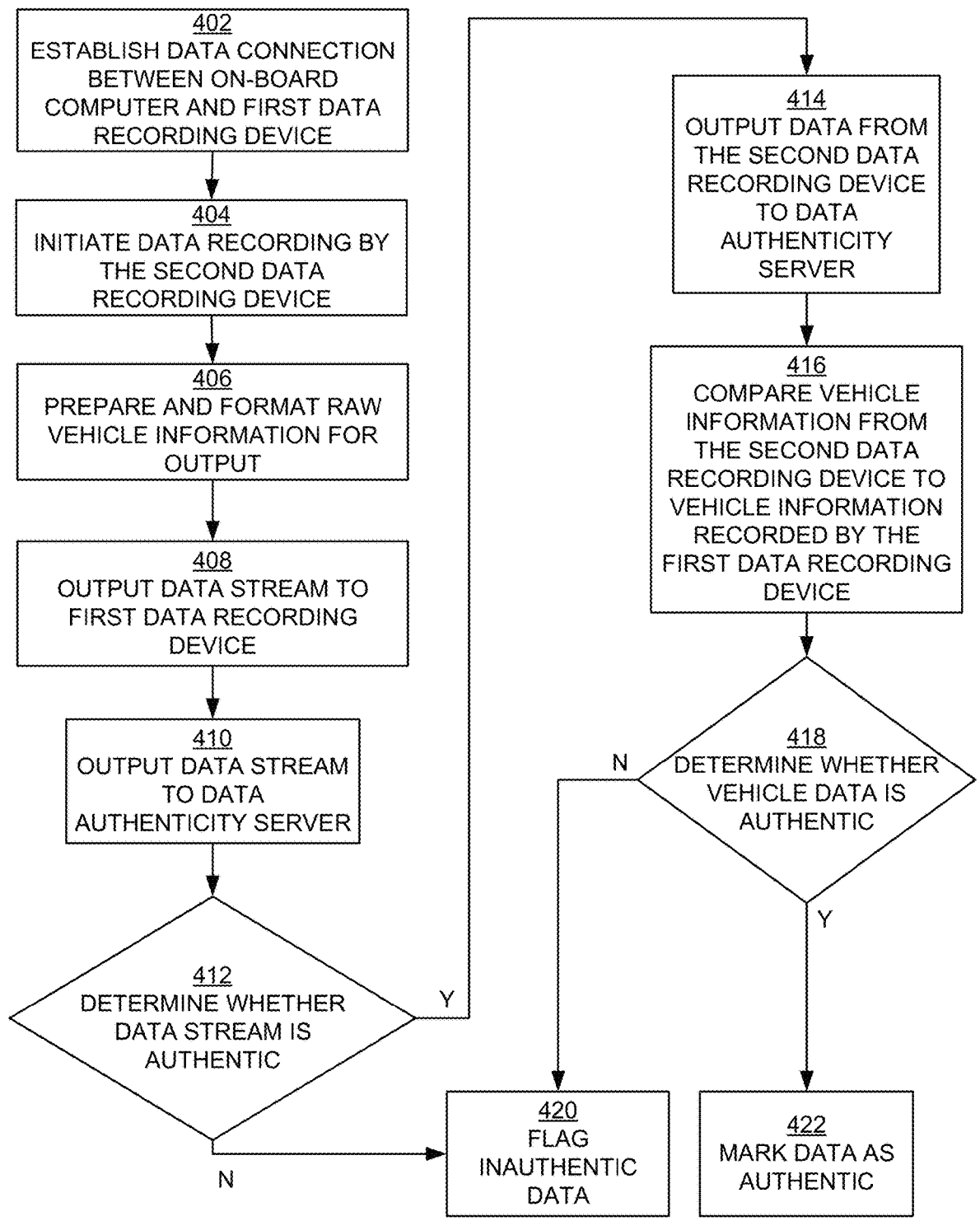
FIG. 4 depicts an illustrative method of determining the authenticity of vehicle performance and/or operational data in accordance with aspects of the present disclosure.

FIG. 4 shows an illustrative method of determining the authenticity of data, such as performance and/or operational data associated with a vehicle according to aspects described herein. At step 402, a data connection may be established between on-board computer and/or processing system 313 of vehicle 310 and a first data recording device such as data recorder 316. The data connection between on-board computer and/or processing system 313 and the first data recording device may be wired (e.g., via data port) and/or wireless (e.g., Bluetooth, Wi-Fi, or the like). Additionally, the data connection established between on-board computer and/or processing system 313 and the first data recorder may be a secure communication channel and/or link.

At step 404, the on-board computer and/or processing system 313 may initiate data recording by a second data recording device (e.g., mobile computing device 314, dongle, etc.). In some arrangements, this step may be performed upon starting the vehicle 310. Alternatively, data recording by the second data recording device may be triggered at a random time during a time interval coinciding with the starting and stopping (i.e., engine ignition and cutoff) of vehicle 310. In some instances, data recording may be initiated at a defined interval coinciding with the starting and stopping of vehicle 310 (i.e., 1 minute after the engine is started until the engine is cutoff, 5 minutes after the engine is started until the engine is cutoff, and the like). In other instances, data recording of the second data recording device may be triggered by a remote request from one of the first data recording device, on-board computer and/or processing system 313, data authenticity server 328, and the like. Additionally, in embodiments in which the second data recording device is mobile computing device 314, data recording may be triggered upon mobile computing device 314 receiving a text message, phone call, and/or push notification from an application (e.g., Facebook, Snapchat, WhatsApp, and the like) operating on mobile computing device 314. In other arrangements, data recording may be initiated after data communication has been established between on-board computer and/or processing system 313 and the first data recording device.

As stated above, mobile computing device 314 may contain a variety of sensors including accelerometers, gyroscope, compass, and global positioning system (GPS) sensors. Using the sensors, mobile computing device 314 may detect and record the vehicle operational information and/or performance data of vehicle 310. The vehicle operational information and/or performance data may be recorded over a first time period and the data may be linked to, or demarcated by, the first time period. For example, the second data recording device may also record acceleration, speed, braking events, turning, or the like of vehicle 310 collected during the first time period and may further associate the data with the first time period at which the data was recorded.

At step 406, on-board computer and/or processing system 313 may prepare raw data including first vehicle operational information and/or performance data received from vehicle operation sensors 211 and cameras/proximity sensors 212 for output to, for example, data recorder 316. The raw data may include vehicle operational information and/or performance data which may comprise engine temperature, engine RPM, vehicle velocity, vehicle acceleration, applied brake force, interior vehicle temperature, exterior vehicle temperature, window displacement, exterior vehicle barometric pressure, exhaust pressure, vehicle emissions, turbo blower pressure, turbo charger RPM, vehicle GPS location, and the like. The vehicle operational information and/or performance data may be further associated with the time period at which the data was recorded. In some instances, the raw data received by on-board computer and/or processing system 313 from vehicle operation sensors 211 and cameras/proximity sensors 212 may be encrypted according to the encryption techniques described herein. The preparation of raw data by on-board computer and/or processing system 313 may include processing operational and/or performance signals from sensors of vehicle 310 into raw data, determining the amount of raw data called for by, for example, data recorder 316 in accordance with the type of vehicle 310, driver rating, type of insurance policy, etc., determining the communication interface (e.g., data port, Bluetooth, Wi-Fi, or the like) through which to send the raw data to, for example, data recorder 316, and formatting the raw data into a transmittable data stream.

On-board computer and/or processing system 313 may format the data stream to protect the authenticity of the data comprised therein. For example, on-board computer and/or processing system 313 may protect the data stream by using watermarking and/or encryption techniques discussed herein. As stated above, watermarking and/or encrypting the data stream may protect the data from being modified and/or may provide the ability to detect modification and/or corruption of the data. The watermark (e.g., data code, data key, or the like) may be inserted periodically, aperiodically, or randomly. The location, contents, and/or form of the watermark may be used in determining whether the data stream is authentic. For example, the data recorder 316, mobile computing device 314, and/or data authenticity server 328 may determine the presence or absence of the watermark in assessing the authenticity of the data when receiving the data stream from on-board computer and/or processing system 313. For example, an absence of the watermark in the predetermined location and/or presence of an incorrect watermark may indicate that the data has been modified and/or corrupted rendering the data inauthentic, as will be discussed more fully herein.

On-board computer and/or processing system 313 may encrypt the data stream and/or insert a watermark (e.g., data code, data key, or the like) into the data stream before outputting the data stream to data recorder 316 and/or mobile computing device 314. In some embodiments, on-board computer and/or processing system 313 may inset both the data code and data key into the data stream. Both the watermark and predetermined data key may be stored within memory of on-board computer and/or processing system 316.

At step 408, on-board computer and/or processing system 316 may output the data stream to the first data recording device (e.g., data recorder 312). At step 410, the first data recording device may output the data stream to data authenticity server 328. At both steps 408 and 410, a secure communication channel and/or link may be established before outputting the data stream. At step 412, data authenticity server 328 may determine whether the received data stream is authentic. For example, the received data stream may be evaluated by data authenticity server 328 to determine whether a watermark is comprised therein in the predetermined location. Upon determining whether the watermark is included within the data stream in the predetermined location, the watermark may be compared with an authenticity code and/or information associated with the data key stored in memory of data authenticity server 328. In some instances, the first data recording device may determine the authenticity of the data stream received from on-board computer and/or processing system 316. In such instances, the first data recording device may be configured to perform similar data authenticity determination measures as described herein in regards to data authenticity server 328. Alternatively, at step 410, the first data recording device may output the data stream to the second data recording device, telematics system 322, or the like, and the data authenticity measures may be performed by the device receiving the data stream from the first data recording device.

If data authenticity server 328 determines that the data stream is inauthentic in step 412, data authenticity server 328 may mark or flag the collected data as inauthentic in step 420.

If data authenticity server 328 determines that the data stream is authentic in step 412, at step 414, the second data recording device may output the second vehicle operational information and/or performance data (e.g., collected during the first time period) to data authenticity server 328. In another example, the second data recording device may continuously output the second vehicle operational information and/or performance data to data authenticity server 328 and upon determining the authenticity of the data stream, the data authenticity server 328 may proceed to step 416, bypassing step 414. The second data recording device may establish a secure communication channel and/or link before outputting the second vehicle operational information and/or performance data.

At step 416, the data authenticity server 328 may compare the second vehicle operational information and/or performance data collected over the first time period and received from the second data recording device to the first vehicle operational information and/or performance data collected over the first time period and received from the first data recording device. For example, the data authenticity server 328 may compare vehicle operational information and/or performance data concerning acceleration, speed, location, braking events, turning, and the like of vehicle 310 received from the first and second data recording devices. The vehicle performance and/or operational data provided by the first and second data recording devices and collected during the first time period may be compared. Upon comparison, at step 418, the data authenticity server 328 system may determine whether the vehicle data recorded by the first data recording device is accurate or authentic based on the comparison. Stated differently, if the second vehicle operational information and/or performance data corroborates (e.g., is within a predetermined threshold of) the first vehicle operational information and performance data, the data may be deemed authentic, as is discussed more fully herein.

In another example, vehicle information recorded by the first data recording device may be compared against expected data thresholds or expected data curves to corroborate the vehicle information recorded by first data recording device. For example, expected data thresholds and expected data curves may include vehicle information provided by the manufacturer of the vehicle. Such vehicle information may include engine temperature, turbocharger RPM, or the like of stock engine vehicle parts provided by the manufacturer upon vehicle production. If there are differences identified between expected data and actual data received from the different vehicle components, the difference may be an indication of inauthentic data or performance part modifications to the vehicle 310.

In some embodiments, certain vehicle performance and/or operational data recorded by the first data recording device may be compared against complimentary data also recorded by the first data recording device. As described above, data authenticity server 328 may utilize and extrapolate the exhaust pressure and engine temperature to corroborate data corresponding to engine RPM and vehicle acceleration. For instance, if the exhaust pressure and engine temperature are known through the expected data thresholds and expected data curves to correlate with a certain engine RPM and vehicle acceleration and the actual engine RPM and acceleration deviate substantially from the expected values, there could be an indication of inauthentic data and/or high-end aftermarket performance part modifications. In some examples, the complimentary data corroboratory procedures described herein may be performed in regards to the data recorded by the second data recording device.

If the data authenticity server 328 determines at step 418 that the vehicle data is authentic (i.e., the data provided by the first data recording device is substantially similar to (e.g., within a predetermined threshold range of) the data provided by the second data recording device), the data authenticity server 328 can indicate or mark the collected data as authentic at step 423. If the data authenticity server 328 determines at step 418 that the collected data is inaccurate or inauthentic (i.e., the data provided by the first data recording device is not substantially similar to the data provided the second data recording device), the data authenticity server 328 can indicate or mark the collected data as inauthentic at step 422.

Figure 5:
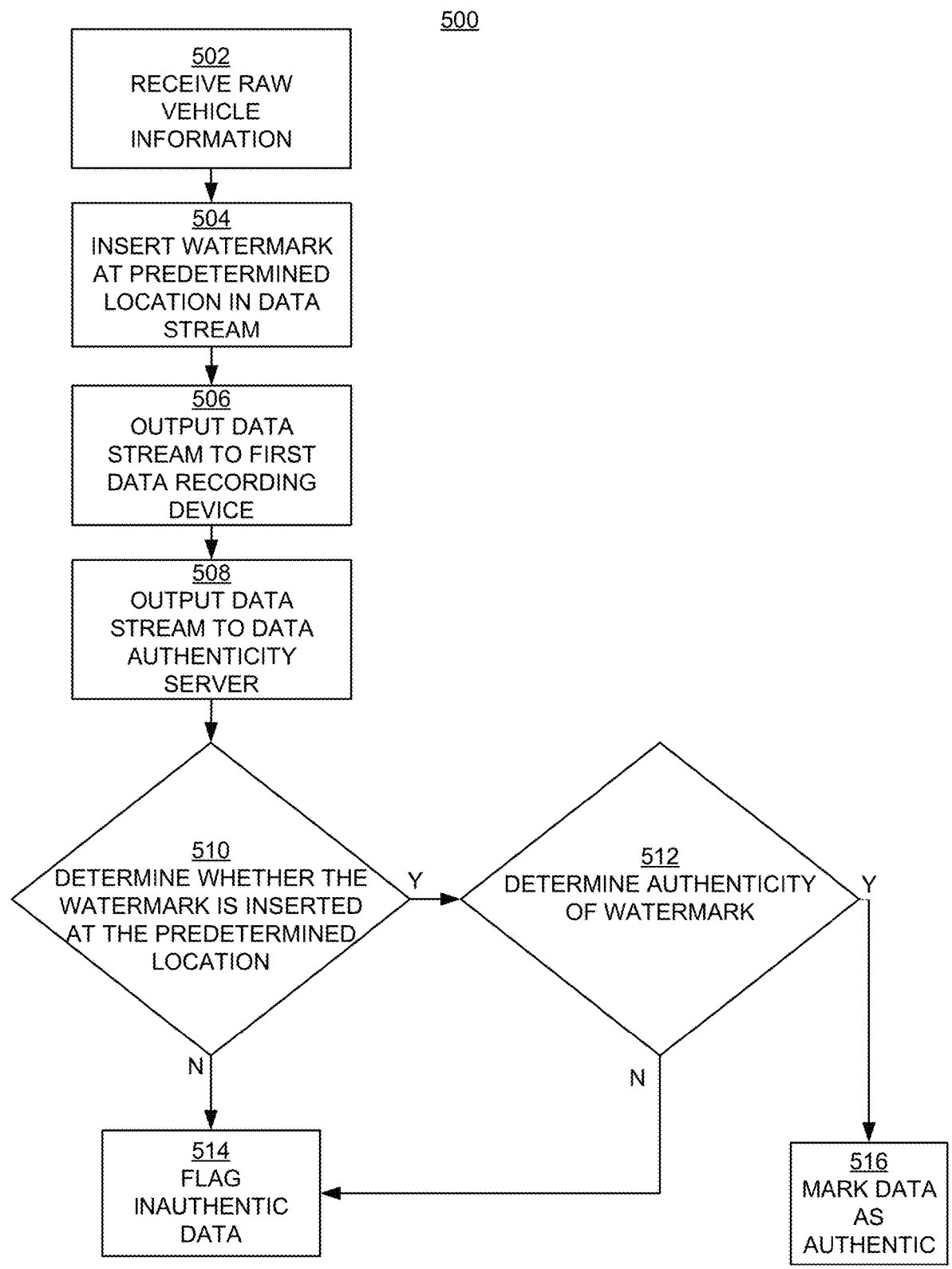
FIG. 5 depicts an illustrative method of watermarking a data stream and verifying the authenticity of the watermark in accordance with aspects of the present disclosure.

FIG. 5 shows an illustrative method of watermarking a data stream according to aspects described herein. At step 502, on-board computer and/or processing system 313 system located on the vehicle 310 may receive raw sensor data including vehicle operational information and/or performance data. The raw data may be collected from various sensors and/or devices on the vehicle 310 and further associated with a time period in which the data was recorded. The raw data may be collected in response to a request from the first data recording device (e.g., data recorder 316) for vehicle information, or may be collected in real-time by on-board computer and/or processing system 313. In other embodiments, the raw data may be collected in response to a request from data authenticity server 328, or mobile device 314.

At step 504, the on-board computer and/or processing system 313 may insert a watermark at one or more predetermined locations in the data stream. The watermark may be inserted periodically, aperiodically, or randomly. In certain embodiments, the watermark may include a data code or data key. In other embodiments, the watermark may include both the data code and data key.

At step 506, on-board computer and/or processing system 313 may output the watermarked data stream to the first data recording device via the data port, Bluetooth interface, or any comparable communication interface of the vehicle 310. A step 508, the first data recording device may output the data stream to the data authenticity server 328.

At step 510, data authenticity server 328 may evaluate the data stream to determine whether a watermark has been inserted into the data stream at the predetermined location. If the watermark (e.g., data code, data key, or the like) has not been inserted into the data stream, or has been inserted into an incorrect portion of the data stream inconsistent with the predetermined location, the data authenticity server 328 may flag the data stream as being inauthentic in step 514. If the watermark has been determined to be present in the data stream and at the predetermined location in step 510, then data authenticity server 328 may determine whether the data code and/or data key is an authentic data code and/or data key at step 512. If the data code and/or data key are determined to be authentic, they may be marked as authentic at step 516. If the data code and/or data key are determined to be inauthentic, then data authenticity server 328 may proceed to step 514 and flag the collected data as inauthentic.

Figure 6:
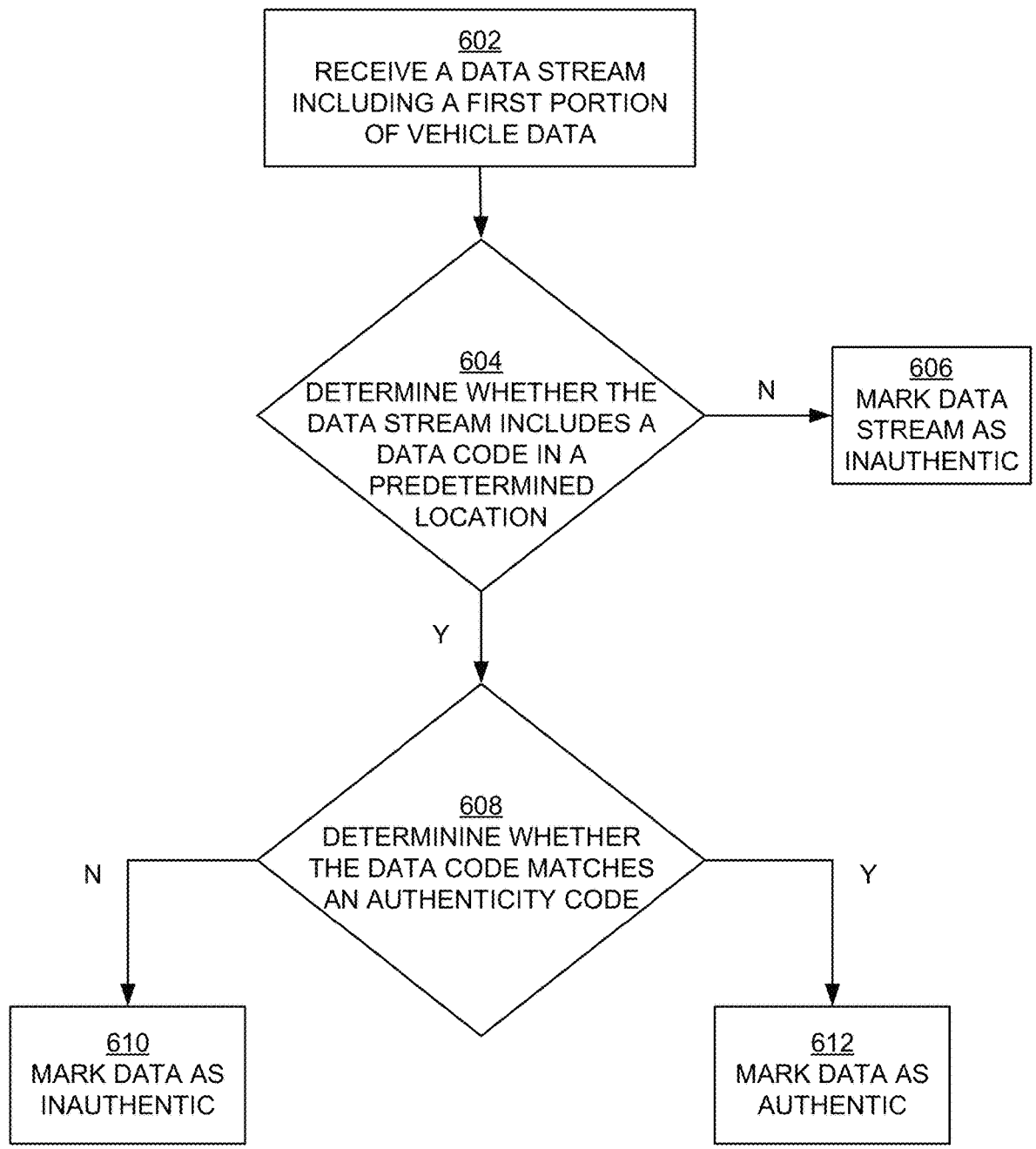
FIG. 6 depicts an illustrative method of watermark data code identification and verification in accordance with aspects of the present disclosure.

FIG. 6 shows an illustrative method of watermark data code identification and verification according to aspects described herein. At step 602, a computing device such as data authenticity server 328 may receive a data stream from on-board computer and/or processing system 313, data recorder 316, or mobile device 314. The data stream may include a first portion of vehicle data such as vehicle performance and/or operational data. The first portion of vehicle data may be associated with a first time period in which the data was recorded.

After receiving the data stream, at step 604, the computing device may determine whether the data stream includes a data code in a predetermined location. As discussed above, the computing device may have memory wherein information associated with the predetermined location is stored. If the computing device determines that data stream does not contain the data code in the predetermined location, or that the data stream contains the data code in an incorrect location, the computing device may mark the data stream as inauthentic at step 606. In at least some examples, this may cause the data within the data stream to be deemed inauthentic as well.

If the computing device determines that the data stream contains the data code in the predetermined location, at step 608, the computing device may determine whether the data code matches an authenticity code. As stated above, the authenticity code may be a data code stored (e.g., pre-stored) in advance of collection of the vehicle operational and/or performance data. If the computing device determines that the data code does not match the authenticity code, in step 610 the computing device may mark the data as inauthentic. If the computing device determines that the data code does match the authenticity code, in step 612 the computing device may mark the data as authentic.

Figure 7:
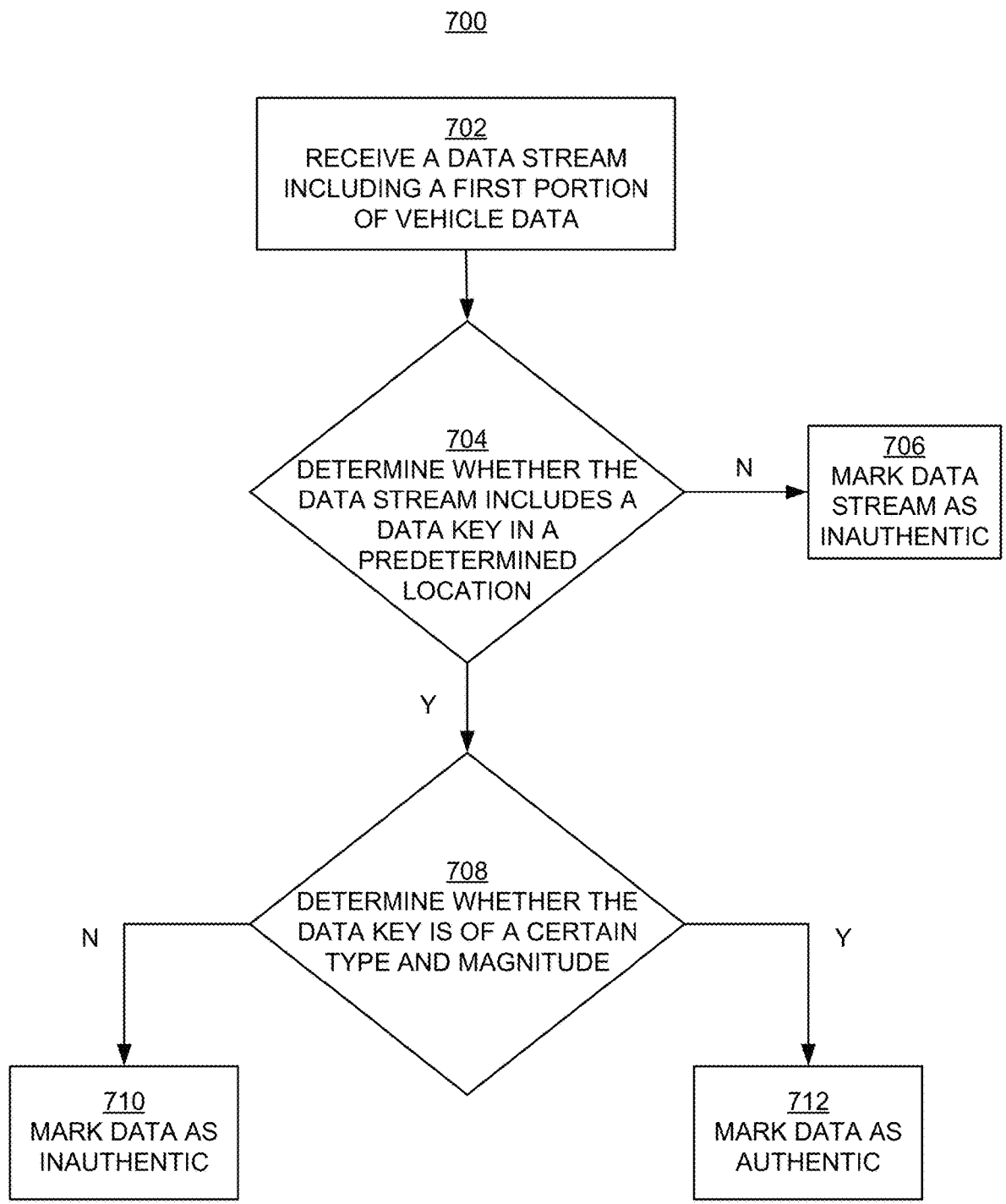
FIG. 7 depicts an illustrative method of watermark data key identification and verification in accordance with aspects of the present disclosure.

FIG. 7 shows an illustrative method of watermark data code identification and verification according to aspects described herein. At step 702, a computing device such as data authenticity server 328 may receive a data stream from on-board computer and/or processing system 313, data recorder 316, or mobile device 314. The data stream may include a first portion of vehicle data such as vehicle performance and/or operational data.

After receiving the data stream, at step 704, the computing device may determine whether the data stream includes a data key in a predetermined location. As stated above, the computing device may have memory wherein information associated with the predetermined location is stored. If the computing device determines that the data stream does not contain the data key in the predetermined location, or that the data stream contains the data key in an incorrect location, the computing device may mark the data stream as inauthentic in step 706. In at least some examples, this may cause the system to deem the data contained within the data steam as inauthentic as well.

If the computing device determines that the data stream contains the data key in the predetermined location, at step 708, the computing device may determine whether the data key is of a certain data type and magnitude. As stated above, the data types and magnitudes associated with the data key may be stored in memory of the computing device. If the computing device determines that the data key is not of a certain data type and magnitude, in step 710 the computing device may mark the data as inauthentic. If the computing device determines that the data key is of a certain data type and magnitude, in step 712 the computing device may mark the data as authentic.

Steps of the FIGS. 4-7 may be added, omitted, rearranged, and/or modified without departing from the invention.

Upon determining that data is authentic (e.g., using any of the arrangements discussed herein), the system may determine one or more incentives (e.g., insurance incentives), discounts, rebates, driver scores, etc. for the user based on the data. That is, authentic driving data may be important in ensuring that a driver is being accurately evaluated.

As discussed herein, the systems and arrangements described herein may aid in identifying telematics or other vehicle operational data that has been tampered with or modified (e.g., without authorization to do so). Such arrangements may aid in ensuring that data being collected is authentic and, accordingly, providing insurance incentives, driver ratings, premium discounts, and the like, based on accurate information. The arrangements described herein include various techniques, such as inserting a watermark into a data stream in a predefined location, corroborating data using multiple data recording devices, and the like. In some examples, the system may also require a data collection device (e.g., a telematics device) having a data encryption key matching that of the vehicle (or corresponding to that of the vehicle). This encryption key may then be used to encrypt data passing from the vehicle to the device in order to secure the data. In some examples, only an authentic device may be able to read or decrypt the data.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, where the described implementation includes software, it should be understood that a combination of hardware and software or hardware alone may be used in various other embodiments. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

The invention claimed is:

1. A system, comprising:
a telematics device located in a vehicle and configured to record real-time vehicle measurement data; and
a computing device configured to:
receive, from the telematics device, a data stream of the real-time vehicle measurement data;
determine whether a watermark is included in a predetermined location in the data stream of the real-time vehicle measurement data by:
determining whether the data stream includes a data key in the predetermined location, wherein the data key corresponds to a data type and a data magnitude associated with the data type, and
in response to determining that the data stream includes the data key in the predetermined location, determining if the data type of the data key matches a predetermined data type and if the data magnitude of the data key matches a predetermined magnitude,
wherein the data type comprises an engine temperature, an engine RPM, a vehicle velocity, a vehicle acceleration, or an applied brake force; and
in response to determining that the watermark is not in the predetermined location, mark the real-time vehicle measurement data as inauthentic.

2. The system of claim 1, wherein the real-time vehicle measurement data comprises at least one of engine temperature, engine RPM, vehicle velocity, vehicle acceleration, applied brake force, interior vehicle temperature, exterior vehicle temperature, window displacement, exterior vehicle barometric pressure, exhaust pressure, vehicle emissions, turbo blower pressure, turbo charger RPM, or vehicle GPS location.

3. The system of claim 1, wherein the computing device is further configured to determine whether the data stream includes the watermark in the predetermined location by:
determining whether the data stream includes a data code in the predetermined location, wherein information for identifying the predetermined location is stored in a memory of the computing device; and
in response to determining that the data stream includes the data code in the predetermined location, determining if the data code matches an authenticity code stored in the memory of the computing device.

4. The system of claim 3, wherein the data code is a character, an integer, a sequence of characters and/or integers, or a Fibonacci sequence.

5. The system of claim 1, wherein the predetermined location comprises a predetermined periodic location, a predetermined aperiodic location, or a random location.

6. The system of claim 1, wherein the computing device is further configured to:
in response to determining that the watermark is in the predetermined location:
determine whether the watermark is authentic; and
in response to determining that the watermark is inauthentic, mark the real-time vehicle measurement data as inauthentic.

7. The system of claim 6, wherein the computing device is further configured to, in response to determining that the watermark is authentic, mark the real-time vehicle measurement data as authentic.

8. The system of claim 1, wherein the computing device is further configured to:
determine expected manufacturer thresholds for vehicle parts of the vehicle;

compare the real-time vehicle measurement data to the expected manufacturer thresholds to determine whether one or more of the vehicle parts have been modified;
determine whether the one or more of the vehicle parts have been modified based on whether the real-time vehicle measurement data deviates from the expected manufacturer thresholds by more than a predetermined amount; and
in response to determining that the one or more of the vehicle parts have been modified, mark the real-time vehicle measurement data as inauthentic.

9. The system of claim 1, wherein the computing device is further configured to mark the real-time vehicle measurement data as inauthentic, in response to determining that the watermark is included in a location other than the predetermined location.

10. An apparatus, comprising:
at least one processor; and
memory storing computer-readable instructions that, when executed by the at least one processor, cause the apparatus to:
receive, from a telematics device located in a vehicle and configured to record real-time vehicle measurement data, a data stream of the real-time vehicle measurement data;
determine whether a watermark is included in a predetermined location in the data stream of the real-time vehicle measurement data by:
determining whether the data stream includes a data key in the predetermined location, wherein the data key corresponds to a data type and a data magnitude associated with the data type, and
in response to determining that the data stream includes the data key in the predetermined location, determining if the data type of the data key matches a predetermined data type and if the data magnitude of the data key matches a predetermined magnitude, wherein the data type comprises an engine temperature, an engine RPM, a vehicle velocity, a vehicle acceleration, or an applied brake force; and
in response to determining that the watermark is not in the predetermined location, mark the real-time vehicle measurement data as inauthentic.

11. The apparatus of claim 10, wherein the real-time vehicle measurement data comprises at least one of engine temperature, engine RPM, vehicle velocity, vehicle acceleration, applied brake force, interior vehicle temperature, exterior vehicle temperature, window displacement, exterior vehicle barometric pressure, exhaust pressure, vehicle emissions, turbo blower pressure, turbo charger RPM, or vehicle GPS location.

12. The apparatus of claim 10, wherein the instructions, when executed by the at least one processor, further cause the apparatus to determine whether the data stream includes the watermark in the predetermined location further by:
determining whether the data stream includes a data code in the predetermined location, wherein information for identifying the predetermined location is stored in the memory; and
in response to determining that the data stream includes the data code in the predetermined location, determining if the data code matches an authenticity code stored in the memory.

13. The apparatus of claim 12, wherein the data code is a character, an integer, a sequence of characters and/or integers, or a Fibonacci sequence.

14. The apparatus of claim 10, wherein the predetermined location comprises a predetermined periodic location, a predetermined aperiodic location, or a random location.

15. The apparatus of claim 10, wherein the instructions, when executed by the at least one processor, further cause the apparatus to:
in response to determining that the watermark is in the predetermined location:
determine whether the watermark is authentic;
in response to determining that the watermark is inauthentic, mark the real-time vehicle measurement data as inauthentic; and
in response to determining that the watermark is authentic, mark the real-time vehicle measurement data as authentic.

16. One or more non-transitory, computer-readable media storing instructions that, when executed by a computing device, cause the computing device to:
receive, from a telematics device located in a vehicle and configured to record real-time vehicle measurement data, a data stream of the real-time vehicle measurement data;
determine whether a watermark is included in a predetermined location in the data stream of the real-time vehicle measurement data by:
determining whether the data stream includes a data key in the predetermined location, wherein the data key corresponds to a data type and a data magnitude associated with the data type, and
in response to determining that the data stream includes the data key in the predetermined location, determining if the data type of the data key matches a predetermined data type and if the data magnitude of the data key matches a predetermined magnitude, wherein the data type comprises an engine temperature, an engine RPM, a vehicle velocity, a vehicle acceleration, or an applied brake force; and
in response to determining that the watermark is not in the predetermined location, mark the real-time vehicle measurement data as inauthentic.

17. The one or more non-transitory, computer-readable media of claim 16, wherein the real-time vehicle measurement data comprises at least one of engine temperature, engine RPM, vehicle velocity, vehicle acceleration, applied brake force, interior vehicle temperature, exterior vehicle temperature, window displacement, exterior vehicle barometric pressure, exhaust pressure, vehicle emissions, turbo blower pressure, turbo charger RPM, or vehicle GPS location.

18. The one or more non-transitory, computer-readable media of claim 16, wherein the instructions, when executed by the computing device, further cause the computing device to determine whether the data stream includes the watermark in the predetermined location by:
determining whether the data stream includes a data code in the predetermined location, wherein information for identifying the predetermined location is stored in a memory of the computing device; and
in response to determining that the data stream includes the data code in the predetermined location, determining if the data code matches an authenticity code stored in the memory of the computing device.

19. The one or more non-transitory, computer-readable media of claim 18, wherein the data code is a character, an integer, a sequence of characters and/or integers, or a Fibonacci sequence.

20. The one or more non-transitory, computer-readable media of claim 16, wherein the predetermined location is a predetermined periodic location, a predetermined aperiodic location, or a random location.

* * * * *